United States Patent
Yagi et al.

(12) 
(10) Patent No.: US 6,424,122 B2
(45) Date of Patent: Jul. 23, 2002

(54) BATTERY CHARGING CONTROL UNIT AND METHOD FOR CONTROLLING BATTERY CHARGING

(75) Inventors: Kazuhiko Yagi; Takashi Ishikura; Kazuhisa Okamoto; Yoshinori Mita; Kenji Watanabe; Kazunori Watanabe, all of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/789,513

(22) Filed: Feb. 22, 2001

(30) Foreign Application Priority Data

Feb. 23, 2000 (JP) ........................................ 2000-046564

(51) Int. Cl.$^7$ .................................................. H02J 7/00
(52) U.S. Cl. ...................................................... 320/132
(58) Field of Search ................................ 320/132, 144, 320/150–153, 160

(56) References Cited

U.S. PATENT DOCUMENTS 5,592,070 A * 1/1997 Mino ........................... 320/163
5,617,009 A * 4/1997 Takao et al. .................. 320/152
5,900,717 A * 5/1999 Lee ............................. 320/150

\* cited by examiner

Primary Examiner—Edward H. Tso
Assistant Examiner—Pia Tibbits
(74) Attorney, Agent, or Firm—Arent Fox Kintner Plotkin & Kahn, PLLC

(57) ABSTRACT

A battery charging control unit which controls electric power and supplies it to a battery via a charger. The battery charging control unit includes: a charging capacity insufficiency detection unit, a charging capacity restoring determination unit, and a supplemental charging unit. The charging capacity insufficiency detection unit detects an insufficiency in charging capacity of the battery based on the previous charging condition of the battery. The charging capacity restoring determination unit determines if the insufficiency in charging capacity of the battery will be restored by carrying out a supplemental charging process on the battery. The supplemental charging unit carries out the supplemental charging process for the battery if the charging capacity insufficiency detection unit detects the insufficiency in charging capacity of the battery and the charging capacity restoring determination unit determines that the insufficiency in charging capacity of the battery will be restored by the supplemental charging process.

20 Claims, 6 Drawing Sheets

|     | 1  | 2  | 3  | 4 ··· |
|-----|----|----|----|-------|
| 8Ah | 50 | 34 | 24 | 10 ···|
| 4Ah | 10 | 8  | 6  | 4 ··· |

BATTERY CHARGING CONTROL UNIT AND METHOD FOR CONTROLLING BATTERY CHARGING

BACKGROUND OF THE INVENTION

1. Field of the Invention

The present invention relates to battery charging control units and methods for controlling battery charging. More specifically, the present invention relates to a battery charging control unit for batteries used, for instance, for an electric vehicle, and a method for controlling the charging of such batteries.

2. Description of Related Art

In general, processes of charging, discharging, and recharging batteries are repeated when batteries are used. If the batteries are used for a certain period of time and these processes of charging and discharging are repeated a considerable number of times, the level of a full charge, i.e., the level at which the batteries are a fully charged to their maximum charging capacity, as compared with the initial level of full charge of the batteries, will decrease.

If this decrease in the charging capacity is caused temporarily by such factors as memory effect, it is known that the batteries can be restored to some extent by carrying out a supplemental charging (i.e., a complete charging/discharging) of the batteries.

As disclosed in the Japanese Unexamined Patent Application, First Publication No. 62-260531, for instance, the decrease in the charging capacity of the batteries can be restored by carrying out a supplemental charging process (or an even charging process) each predetermined number of times that the battery is charged.

However, among the environments in which the battery is used, there are cases in which, depending on the condition of the battery, supplemental charging of the batteries should not be carried out. In particular, when the battery is installed in an electric automobile, for example, the environments in which it is used may vary drastically. The batteries may be used in a harsh temperature environment wherein the temperature of the batteries reaches more than 40° C. during summer and less than –10° C. during winter.

Also, when batteries are in a high temperature environment, there is a danger that the batteries may be damaged by the supplemental charging process because in such an environment the charging current may be consumed in generating heat that increases the temperature of the batteries rather than being used to charge the batteries. Moreover, since a certain amount of the charging current is consumed for generating heat, the electric power is wasted and is economically ineffective.

In consideration of the above, an object of the present invention is to provide a battery charging control unit which is capable of eliminating the problem of the insufficient charging capacity of batteries by carrying out a supplemental charging process reliably at a suitable timing so that a highly efficient state of the batteries may be maintained and the lifetime thereof may be extended.

SUMMARY OF THE INVENTION

The present invention provides a battery charging control unit which controls the electric power from a power source and supplies it to a battery via a charger, comprising: a charging capacity insufficiency detection unit which detects an insufficiency in charging capacity of the battery based on the previous charging condition of the battery, the charging capacity insufficiency detection unit being capable of storing the detected insufficiency in the charging capacity of the battery; a charging capacity restoring determination unit which, after the charging capacity insufficiency detection unit detects an insufficiency in charging capacity of the battery, determines if the insufficiency in charging capacity of the battery will be restored by carrying out a supplemental charging process for the battery; and a supplemental charging unit which carries out the supplemental charging process for the battery if the charging capacity insufficiency detection unit detects an insufficiency in the charging capacity of the battery and the charging capacity restoring determination unit determines the insufficiency in charging capacity of the battery will be restored by the supplemental charging process.

As shown in FIG. 8, the restoring of a battery having a charging capacity insufficiency carried out by a supplemental charging process is confirmed to be effective if such a charging operation is performed after the temperature of the battery has been lowered, for instance, to an ordinary temperature. In consideration of this fact, the above battery charging control unit according to an embodiment of the invention has a structure capable of reliably restoring a battery having a charging capacity insufficiency by performing a suitable supplemental charging operation.

Specifically, the charging capacity insufficiency detection unit of the above battery charging control unit stores the charging condition (or state) of the battery in the previous charging operations in memory and carries out a supplemental charging operation based on the data of the previous charging condition stored in the memory. Also, the charging capacity restoring determination unit determines if the insufficiency in charging capacity of the battery will be restored by carrying out a supplemental charging process for the battery. This is because the restoring of the battery having a charging capacity insufficiency is difficult even with the supplemental charging operation if the temperature is high, as mentioned above, and the charging capacity restoring determination unit determines to carry out a supplemental charging process by the supplemental charging unit only when the restoring of the battery by the supplemental charging operation may be expected based on the battery temperature or the outside air temperature.

That is, the supplemental charging process is carried out only when the charging capacity insufficiency is detected and the restoring of battery is expected. Accordingly, it becomes possible to avoid performing a supplemental charging process when unnecessary. Also, harmful effects to the batteries, such as a temperature increase thereof due to the supplemental charging process or the waste of charging time and energy, may be avoided.

Moreover, since the charging capacity insufficiency detection unit only detects and stores in memory the generation of charging capacity insufficiency and does not carry out a supplemental charging process if the charging capacity restoring determination unit determines that the restoring of the battery is not expected, i.e., the supplemental charging process is carried out only when the restoring of battery is expected, and thus it becomes possible to carry out the supplemental charging process reliably.

Further, problems associated with a conventional periodic supplemental charging process, in which the process may be carried out unnecessarily, may be eliminated, simply resulting in an increase in the temperature of batteries that may shorten their life.

In accordance with another aspect of the invention, the charging capacity restoring determination unit determines if the battery will be restored by the supplemental charging process based on at least one of the battery temperature, and the outside air temperature.

According to the above battery charging control unit, since the charging capacity restoring determination unit determines if the battery will be restored by the supplemental charging process based on at least one of a battery temperature, and an outside air temperature, reliably carrying out the supplemental charging process to restore the battery when the restoring thereof is expected becomes possible.

Also, causing harmful effects to the battery, which may occur if a supplemental charging process is carried out when the temperature of battery or outside air is extremely high, may be avoided. Moreover, saving the time and energy that would be wasted if an unnecessary supplemental charging operation is performed becomes possible.

In yet another aspect of the invention, a battery charging control unit further includes: an integrated calendar, wherein the charging capacity restoring determination unit determines if the battery will be restored by the supplemental charging process based on the integrated calendar.

According to the above battery charging control unit, data for dates, months, or seasons, or information relating to annual temperature change may be input into the integrated calendar so that the charging capacity restoring determination unit may determine if the battery will be restored by a supplemental charging process based on the data contained in the integrated calendar. Therefore, it becomes possible, for instance, to effectively restore the battery by carrying out supplemental charging processes mainly in spring or fall, when the restoring of the battery is highly expected, and avoid a season such as summer or winter, when there is little expectation of the restoring of the battery.

In yet another aspect of the invention, a battery charging control unit further includes a point counter, wherein the charging capacity insufficiency detection unit is capable of calculating a degree of the insufficiency in charging capacity of the battery by adding a certain predetermined point, which is based on the previous charging condition of the battery, to the point counter, and the supplemental charging unit is capable of carrying out the supplemental charging process when points in the point counter exceed a predetermined value.

According to the above battery charging control unit, the previous charging condition or state of the battery may be converted into numerical points and the points may be accumulated in the point counter so that a supplemental charging process by the supplemental charging unit may be reliably carried out for the battery based on the information obtained from the accumulated points.

In yet another aspect of the invention, the charging capacity insufficiency detection unit adds a certain number of points to the point counter if a charging process for charging the battery is terminated before being finished.

According to the above battery charging control unit, the effect of terminating a charging process before being finished may be converted into a point and this point is accumulated so that such an effect may be reflected in subsequent charging processes to carry out the processes reliably.

In yet another aspect of the invention, the charging capacity insufficiency detection unit adds a certain number of points to the point counter if a charging process for charging the battery is temporarily stopped due to a temperature rise in the battery exceeding a first predetermined temperature.

According to the above battery charging control unit, the effect of temporarily stopping a charging process due to a temperature rise in the battery exceeding a first predetermined temperature may be converted into a point and the point is accumulated so that such an effect may be reflected in subsequent charging processes. That is, since the increase in battery temperature during a charging process can be a factor for causing a charging capacity insufficiency, the factor is converted into a point and the point is accumulated so that a subsequent charging process may be carried out reliably.

In yet another aspect of the invention, the charging capacity insufficiency detection unit adds a certain number of points to the point counter if the temperature of the battery is greater than a second predetermined temperature upon the completion of the charging process.

According to the above battery charging control unit, the effect of the temperature of the battery greater than a second predetermined temperature upon the completion of the charging process may be converted into a point and the point is accumulated so that such an effect may be reflected in subsequent charging processes. That is, since an extremely high temperature of the battery at the completion of the charging process can be a factor for causing a charging capacity insufficiency, the factor is converted into a point and the point is accumulated so that a subsequent charging process may be carried out reliably.

In yet another aspect of the invention, the supplemental charging unit determines a charging manner in the supplemental charging process based on the level of charging capacity insufficiency detected by the charging capacity insufficiency detection unit.

According to the above battery charging control unit, the supplemental charging unit may reliably restore the battery by carrying out a supplemental charging process using a most suitable charging manner (i.e., charging current, charging time, ampere-hour, etc.) for the battery based on the level of charging capacity insufficiency detected by the charging capacity insufficiency detection unit. That is, if the level of the charging capacity insufficiency is large, the supplemental charging magnitude is increased to achieve an early restoring of the battery and, if the level of the charging capacity insufficiency is small, the supplemental charging magnitude is decreased to achieve a restoring of the battery in an unforced manner.

In yet another aspect of the invention, the charging capacity insufficiency detection unit subtracts, after the completion of the supplemental charging process by the supplemental charging unit, a certain number of points from the point value accumulated in the point counter.

According to the above battery charging control unit, since a certain number of points, which corresponds to the level of battery restoring by the supplemental charging process, are subtracted from the point value in the point counter by the charging capacity insufficiency detection unit, the level of battery restoring by the supplemental charging process may be reflected as points so that the state or condition of the battery may be reliably accumulated in the point counter as a numerical point value.

In yet another aspect of the invention, the points subtracted from the point value in the point counter is predetermined in accordance with the temperature of the battery at the completion of the supplemental charging process.

According to the above battery charging control unit, since the subtracted points which correspond to the degree of restoration of the battery by a supplemental charging process are predetermined based on the battery temperature, the points subtracted may be increased in the temperature range in which a significant restoring of the battery is expected and the points subtracted may be decreased in the temperature range in which there is little expectation that the battery will be restored. Accordingly, the difference in the level of battery restoring due to the difference of the battery temperature may be accurately reflected as subtracted points, and the points may be subtracted from the point value in the point counter so that the state or condition of the battery may be reliably accumulated in the point counter as a point value.

In yet another aspect of the invention, the points subtracted from the point value in the point counter is predetermined in accordance with the charging magnitude of the supplemental charging process.

According to the above battery charging control unit, since the subtracted points, which correspond to the degree of restoration of the battery by a supplemental charging process, are predetermined based on the charging current of the supplemental charging process, the level of restoring of the battery corresponding to the charging magnitude of supplemental charging process may be accurately reflected as a subtracted points by increasing the subtracted points when the charging magnitude is large and decreasing the subtracted points when the charging magnitude is small, and the point may be subtracted from the point value in the point counter so that the state or condition of the battery may be reliably accumulated in the point counter as a point value.

In yet another aspect of the invention, the points subtracted from the point value in the point counter are predetermined in accordance with the number of the supplemental charging processes performed by the supplemental charging unit.

According to the above battery charging control unit, since the subtracted points, which correspond to the degree of restoration of the battery by a supplemental charging process, are predetermined based on the number of supplemental charging processes, the level of the restoring of the battery, which decreases as the number of supplemental charging processes increases, may be accurately reflected as subtracted points, and the points may be subtracted from the point value in the point counter so that the state or condition of the battery may be reliably accumulated in the point counter as a point value.

The present invention also provides a method for controlling battery charging by controlling a power from a power source and supplying it to a battery via a charger, including the steps of: (a) carrying out a charging capacity insufficiency detection process to determine whether the charging capacity of the battery is insufficient or not; (b) carrying out a restoring effect determination process that determines if the charging capacity insufficiency in the battery will be restored by a supplemental charging process; and (c) carrying out a supplemental charging process of the battery to restore the charging capacity insufficiency of the battery if it is determined that the charging capacity of the battery is insufficient in the charging capacity insufficiency detection process and that the battery will be restored by the supplemental charging process in the restoring effect determination process.

In accordance with another aspect of the present invention, whether the battery will be restored by the supplemental charging process is determined in the restoring effect determination process based on information of at least one of a battery temperature and an outside air temperature.

In yet another aspect of the invention, the charging capacity insufficiency detection process includes the steps of: (i) determining if the charging process is terminated prior to the completion of the charging process, and adding a certain number of points if it is determined that the charging process has been terminated before completion; (ii) determining if the charging process has been temporarily stopped because of a temperature rise in the battery that is higher than a first predetermined temperature, and adding a certain number of points if it is determined that the charging process is temporarily stopped because of a temperature rise in the battery that is higher than the first predetermined temperature; and (iii) determining if the temperature of the battery is higher than a second predetermined temperature when the charging process is completed, and adding a certain number of points if it is determined that the battery temperature is higher than the second predetermined temperature when the charging process is completed.

In yet another aspect of the invention, the charging capacity insufficiency detection process further including the steps of: (iv) accumulating the points obtained in the steps (i) through (iii) and determining if the accumulated points are greater than a first predetermined number of points; and (v) correcting the accumulated point, if the accumulated point is greater than the first predetermined point, so that the accumulated points is set equal to the first predetermined point.

In yet another aspect of the invention, the supplemental charging process including the steps of: (i) determining if the accumulated point is greater than a second predetermined point when the supplemental charging process is started; (ii) carrying out a supplemental charging process of the battery in a relatively heavy manner if it is determined that the accumulated point is equal to or greater than the second predetermined point in step (i); and (iii) carrying out a supplemental charging process of the battery in a relatively light manner if it is determined that the accumulated point is smaller than the second predetermined point in step (i).

In yet another aspect of the invention, a method for controlling battery charging further includes the step of: (d) carrying out a point value correction process which includes the steps of: (i) determining whether the battery temperature is equal to or higher than a third predetermined temperature, and subtracting a certain number of points if it is determined that the battery temperature is equal to or higher than the third predetermined temperature; (ii) determining whether the battery temperature is lower than a fourth predetermined temperature, and subtracting a certain number of points if it is determined that the battery temperature is lower than the fourth predetermined temperature; and (iii) determining whether the battery temperature is in the range between the third and the fourth predetermined temperatures, and subtracting a certain number of points which corresponds to the current magnitude and the number of charging processes performed if it is determined that the battery temperature is in the range between the third and the fourth predetermined temperatures.

In yet another aspect of the invention, the point value correction process further including the steps of: (iv) calculating the total of the points obtained in the steps (i) through (iii) of the charging capacity insufficiency detection process and the points subtracted in the steps of (i) through (iii) of the point value correction process, and determining if the accumulated point is greater than a third predetermined point; and (v) correcting the calculated total point, if the total point is less than zero, so that the calculated point be zero.

In yet another aspect of the invention, whether the charging capacity of the battery is insufficient or not in the charging capacity insufficiency detection process is determined based on the calculated total points.

As mentioned above, it is confirmed that the restoring of a battery having a charging capacity insufficiency carried out by a supplemental charging process is effective if such a charging operation is performed after the temperature of the battery is lowered, for instance, to the ordinary temperature. In consideration of this fact, the above method for controlling battery charging according to an embodiment of the invention is capable of reliably restoring a battery having a charging capacity insufficiency by performing a suitable supplemental charging operation.

That is, the charging capacity insufficiency detection process and the supplemental charging process in the above method for controlling battery charging of the present invention may be carried out based on data of the previous charging condition stored in memory. Also, in the charging capacity restoring effect determination process, it is determined if the insufficiency in charging capacity of the battery will be restored by carrying out a supplemental charging process for the battery. This is because the restoring of the battery having a charging capacity insufficiency is difficult even by carrying out the supplemental charging process if the temperature of battery or that of outside air is high. Accordingly, a supplemental charging process is performed only when the charging capacity insufficiency is detected and the restoring of battery is expected. Therefore, performing a supplemental charging process when unnecessary can be avoided. Also, harmful effects on the batteries, such as a temperature increase thereof due to the supplemental charging process or the waste of charging time and energy, may be avoided.

Moreover, since a supplemental charging process is not carried out if it is determined that the restoring of the battery is not expected by the restoring effect determination process, i.e., the supplemental charging process is carried out only when the restoring of battery is expected, the supplemental charging process can be reliably carried out.

Further, problems associated with a conventional periodic supplemental charging process, wherein the process may be carried out when it is unnecessary and simply result in an increase in the temperature of batteries which may shorten their life, may be eliminated.

In addition, since if the battery will be restored by the supplemental charging process is determined in the restoring effect determination process based on information of at least one of the battery temperature, the outside air temperature, and the integrated calendar, the supplemental charging process to restore the battery when the restoring thereof is expected can be reliably carried out.

Also, the harmful effects on the battery that may be caused if a supplemental charging process is carried out when the temperature of battery or outside air is extremely high become avoidable. Moreover, the time and energy that would be wasted if an unnecessary supplemental charging operation is performed can be saved.

BRIEF DESCRIPTION OF THE DRAWINGS

Some of the features and advantages: of the invention have been described, and others will become apparent from the detailed description that follows and from the accompanying drawings, in which.

DETAILED DESCRIPTION OF THE INVENTION

An objective of the present invention is to provide a battery charging control unit which does not have the above-described problems.

Another objective of the present invention is to provide a battery charging control unit which is capable of eliminating problems of an insufficiency of the charging capacity of batteries by carrying out a supplemental charging process reliably at a suitable timing so that a highly efficient state of the batteries may be maintained and the lifetime thereof may be extended.

Yet another object of the present invention is to provide a method for controlling battery charging by which a battery having a charging capacity insufficiency is reliably restored by a suitable charging operation and harmful effects on the battery, such as a temperature increase thereof due to the charging process or the waste of charging time and energy, may be avoided.

The invention summarized above and defined by the enumerated claims may be better understood by referring to the following detailed description, which should be read with reference to the accompanying drawings. This detailed description of a particular preferred embodiment, set out below to enable one to build and use one particular implementation of the invention, is not intended to limit the enumerated claims, but to serve as a particular example thereof.

The inventors of the present invention confirmed that a decrease in charging capacity of batteries due to an early charging process may be caused by various factors, such as the manner of charging, or the temperature of the batteries during or after the charging process. The inventors of the present invention, after thorough study, discovered that it is difficult to restore the decrease in charging capacity of batteries even by carrying out a supplemental charging process if the temperature is extremely high, and that the restoring may be made if the supplemental charging process is carried out when the temperature is lowered to some degree, for instance, to ordinary temperature (refer to FIG. 8).

The inventors of the present invention have successfully completed making a battery charging controlling unit which is capable of reliably restoring batteries of decreased charging capacity by performing a supplemental charging process by taking into account the above-described phenomenon. Also, the inventors of the present invention discovered a method for controlling charging batteries suitable for restoring such batteries.

Figure 1:
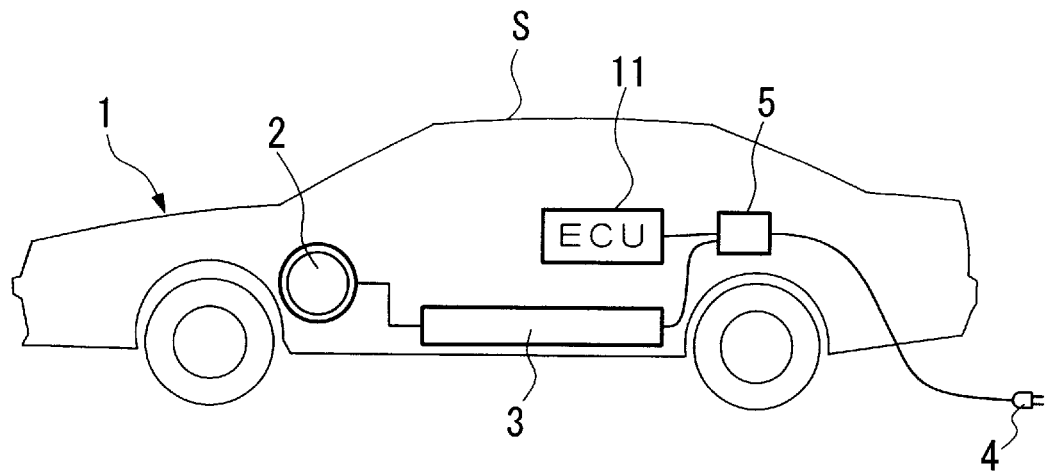
FIG. 1 is a schematic diagram showing an electric vehicle in which a battery charging control unit according to an embodiment of the present invention is mounted.

FIG. 1 is a diagram showing an electric vehicle 1 for explaining an embodiment according to the present invention. As shown in FIG. 1, the electric vehicle 1 has a drive motor 2, batteries 3, a plug 4, a charger 5, and a battery charging control unit 11 (hereinafter also referred to as ECU). The batteries 3 supply electric power to the drive motor 2. That is, a vehicle S is driven by the drive motor 2, which is operated by the electric power supplied from the batteries 3.

The batteries 3 are connected to the charger 5, which is provided with the plug 4 that may be inserted into an outlet for commercial power supply. That is, the electric power from a commercial outlet may be used to charge the batteries 3 via the charger 5 by inserting the plug 4 into the outlet.

The ECU 11 is connected to the charger 5 so that the charging current, charging time, and charging level of the batteries 3 may be controlled by the ECU 11 via the charger 5.

Figure 2:
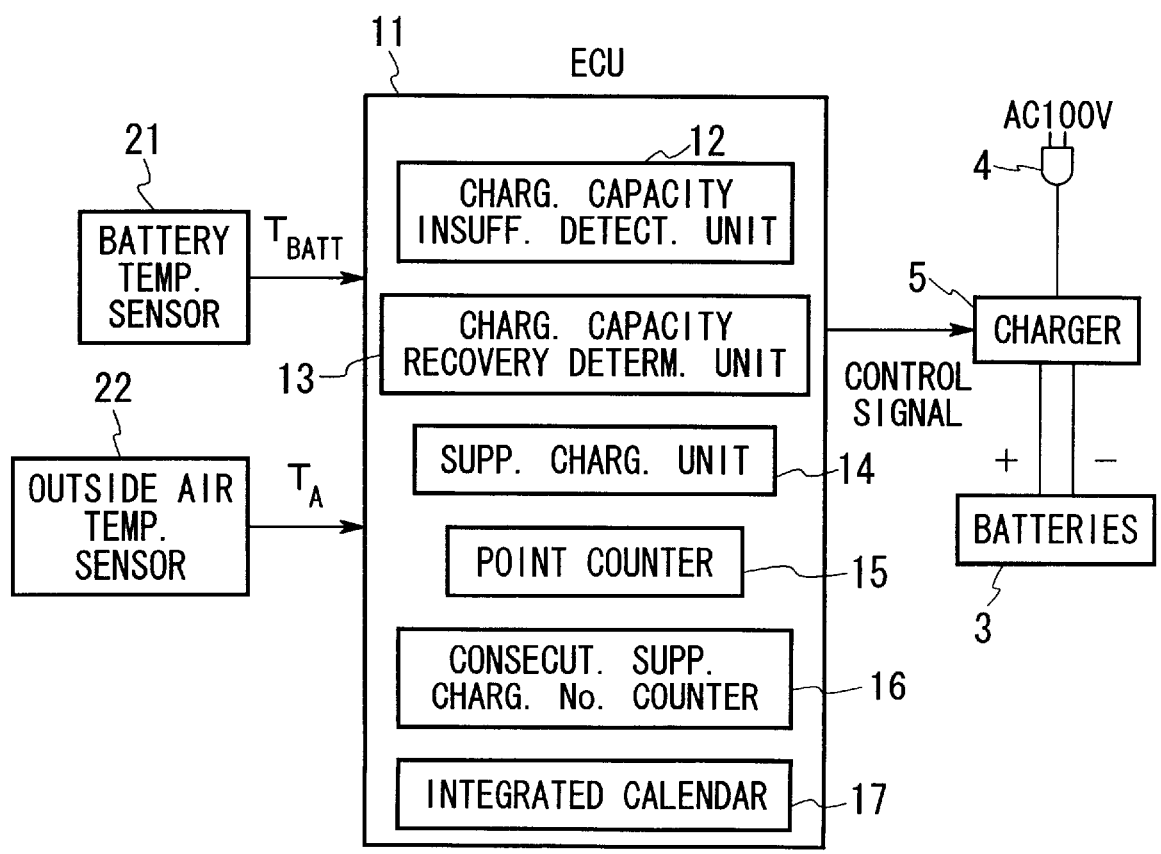
FIG. 2 is a block diagram for explaining the function of the battery charging control unit according to the embodiment of the present invention.
Figure 3:
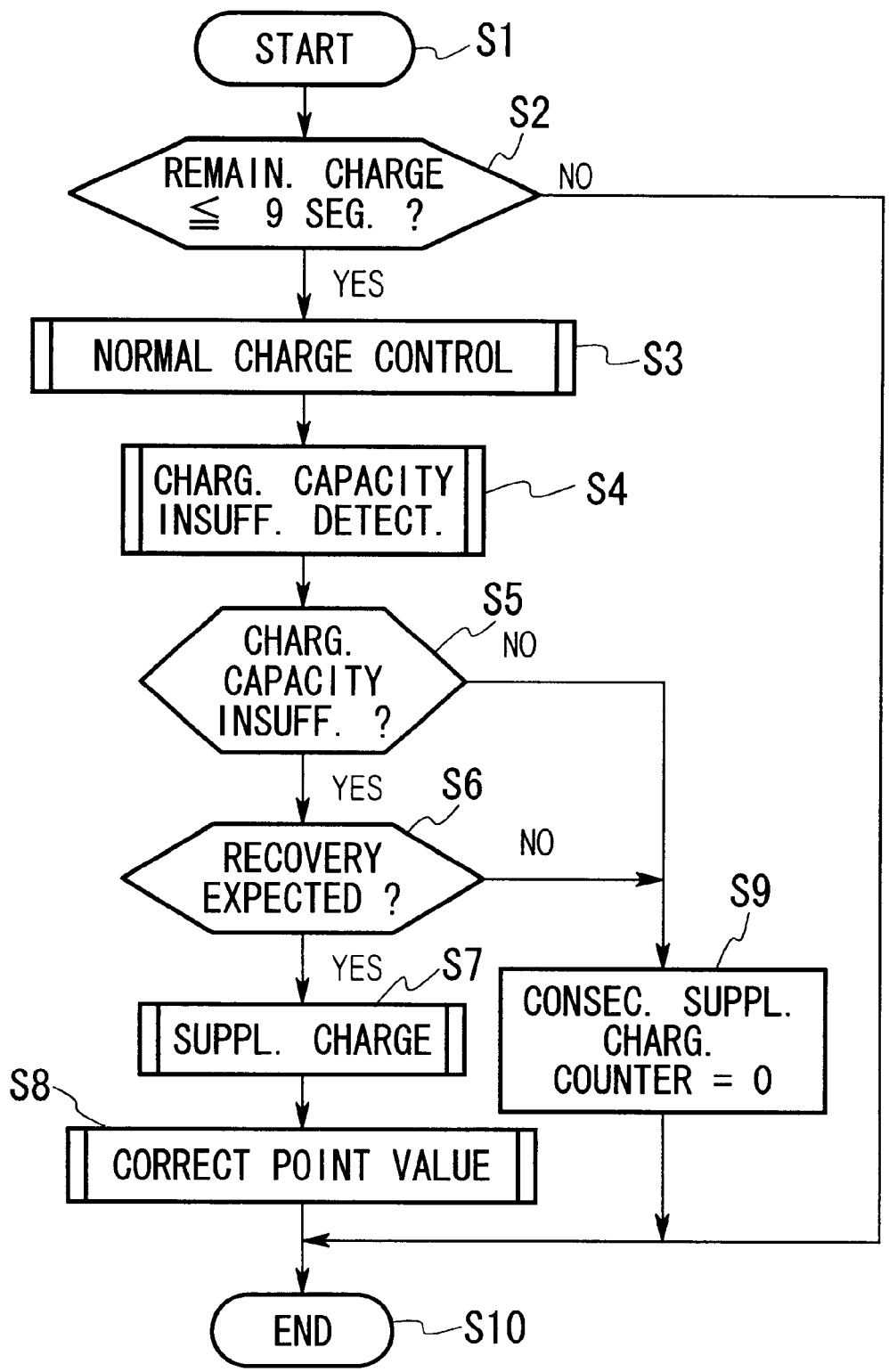
FIG. 3 is a flowchart for explaining a control of battery charging using the battery charging control unit according to the embodiment of the present invention.

As shown in FIG. 2, a charging capacity insufficiency detection unit 12, a charging capacity restoring determination unit 13, and a supplemental charging unit 14 are provided with the ECU 11. Also, a point counter 15, a consecutive supplemental charging number counter 16, and an integrated calendar 17 are provided with the ECU 11.

A battery temperature sensor 21 which detects the temperature of the batteries 3 is provided with the ECU 11 so that a battery temperature $T_{BATT}$ may be detected by the battery temperature sensor 21. Also, an outside air temperature sensor 22 is provided with the vehicle S so that an outside air temperature $T_A$ may be detected by the outside air temperature sensor 22.

The battery temperature sensor 21 and the outside air temperature sensor 22 are connected to the ECU 11, and detection signals from the battery temperature sensor 21 and the outside air temperature sensor 22 are transmitted to the ECU 11.

The ECU 11 outputs a control signal to the charger 5 based on the detection signals from the battery temperature sensor 21 and the outside air temperature sensor 22 so that the charging of the batteries 3 by the charger 5 may be controlled by the ECU 11.

Next, the flow of charging control process by the ECU 11 when the batteries 3 are charged in the above electric vehicle 1 will be explained with reference to FIGS. 3 through 6. Note that in the following explanation of processes according to an embodiment of the present invention, numerical points added to or subtracted from the point counter 15 are assigned only as examples and may be arbitrary altered in so far as the spirit and scope of the invention are maintained.

Step S1: inserting the plug 4 provided with the electric vehicle 1 into an outlet of the electric power such as a commercial power supply.

Step S2: detecting the remaining charge of the batteries 3 by the ECU 11 and determining whether the remaining charge is less than a predetermined value.

If the remaining charge of the batteries 3 is equal to or less than the predetermined value, the flow proceeds to Step S3, and if it is greater than the predetermined value, the flow proceeds to Step S10 and terminates the charging process.

Note that the remaining charge of the batteries 3 may be indicated by, for instance, 10 segments of an indicator lamp and the predetermined value may be indicated by the 9th segment of the lamp in this embodiment. That is, if the remaining charge of the batteries 3 is greater than the predetermined value, the battery charge is regarded as nearly full and a charging process is not carried out even if the plug 4 is inserted into the outlet.

Step S3: controlling the charger 5 by the ECU 11 and starting a charging process (i.e., a normal charging process in this embodiment) of the batteries 3.

That is, a predetermined current from the power supply is supplied to the batteries 3 via the charger 5 to carry out a normal charging operation of the batteries 3. The ECU 11, then, terminates the normal charging process based on the detection signal from the battery temperature sensor 21 when the gradient of the temperature rise of the batteries 3 reaches a predetermined value (i.e., for instance, dT/dt=1.5). This is because the temperature of the batteries 3 is increased due to the fact that some of the electric power supplied to the batteries 3 is not used for the charging process and discharged as a heat instead. The ECU 11 calculates the timing for terminating the normal charging process based on the gradient of the temperature rise of the batteries 3.

Figure 4:
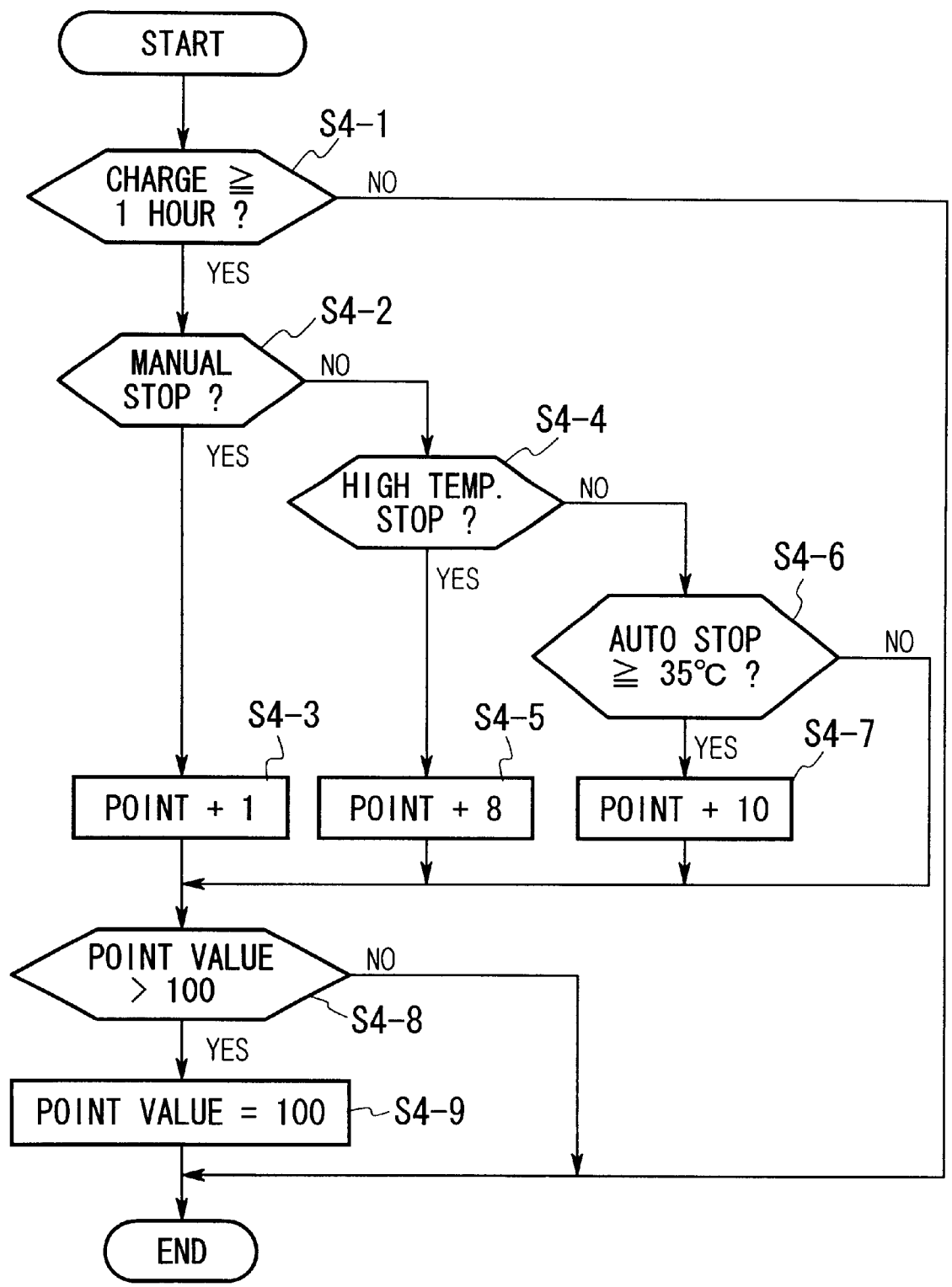
FIG. 4 is a flowchart for explaining a charging capacity insufficiency detection process carried out by using the battery charging control unit according to the embodiment of the present invention.

Step S4: carrying out a charging capacity insufficiency detection process of steps S4-1 through S4-9 shown in FIG. 4 by the charging capacity insufficiency detection unit 12 after the termination of the normal charging process of the batteries 3. Note that although the charging capacity insufficiency detection process by the charging capacity insufficiency detection unit 12 is carried out after the termination of the normal charging process in this embodiment, the timing of performing the charging capacity insufficiency detection process is not limited and may be carried out at any suitable time.

Step S5: determining whether the charging capacity of the batteries 3 is insufficient or not, based on a point value counted by the point counter 15.

If the point value of the point counter 15 is, for instance, equal to or greater than 20 points, the ECU 11 commands the flow to proceed to Step S6, and if the point value is less than 20 points, the ECU commands the flow to proceed to step S9.

Step S6: carrying out a restoring effect determination process that determines if the batteries 3 will be restored by a supplemental charging operation at this stage.

According to an embodiment of the present invention, the charging capacity restoring determination unit 13 of the ECU 11 acquires a battery temperature $T_{BATT}$ and an outside air temperature $T_A$ based on detection signals from the battery temperature sensor 21 and the outside air temperature sensor 22. If the battery temperature $T_{BATT}$ is less than 35° C. or the outside air temperature $T_A$ is less than 30° C., then it is determined that a supplemental charging of the batteries 3 will be effective and the flow proceeds to step S7. If the battery temperature $T_{BATT}$ is equal to or greater than 35° C., or the outside air temperature $T_A$ is equal to or greater than 30° C., then it is determined that a restoring of the batteries 3 by a supplemental charging process cannot be expected at this stage and the flow proceeds to step S9.

Figure 5:
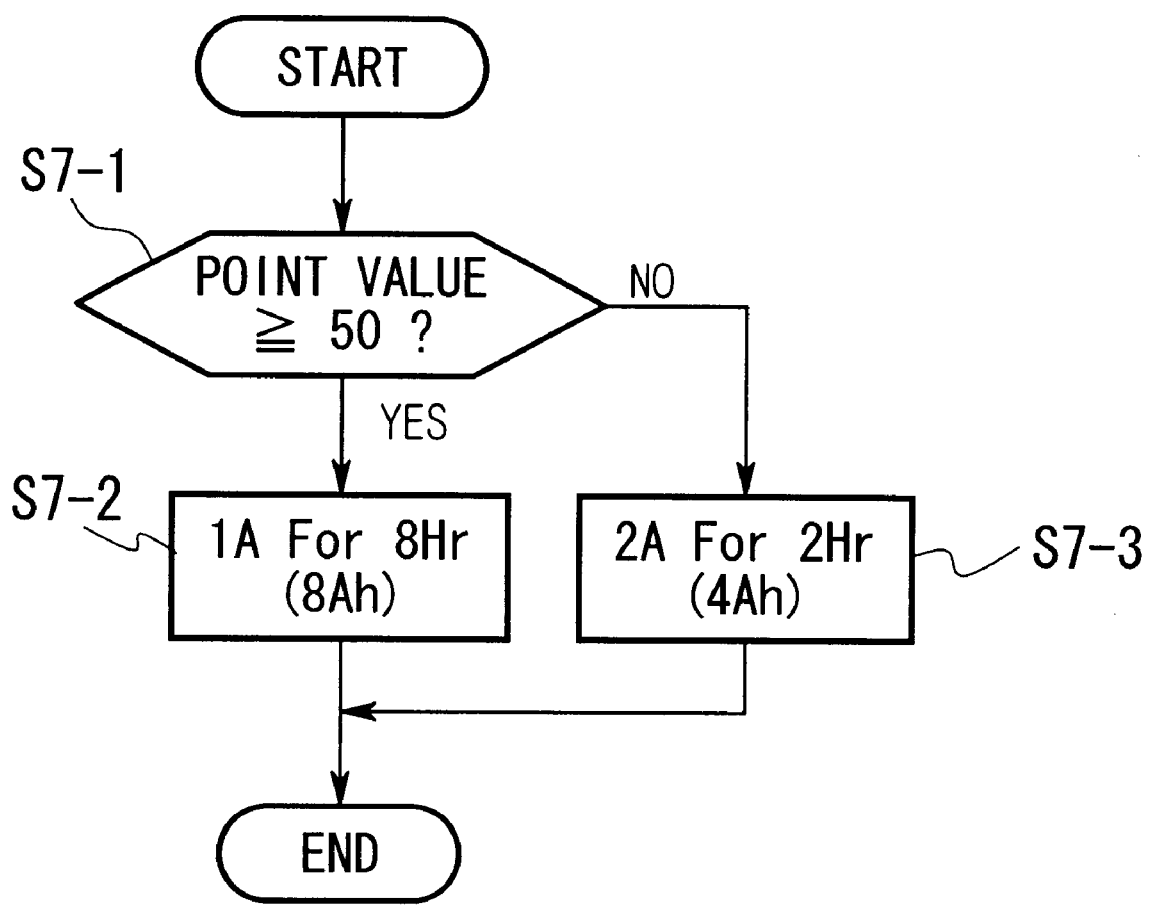
FIG. 5 is a flowchart for explaining a supplemental charging process carried out by using the battery charging control unit according to the embodiment of the present invention.

Step S7: carrying out a supplemental charging process of Step S7-1 through S7-3 shown in FIG. 5 by the supplemental charging unit 14 of the ECU 11 that controls the charger 5.

Figure 6:
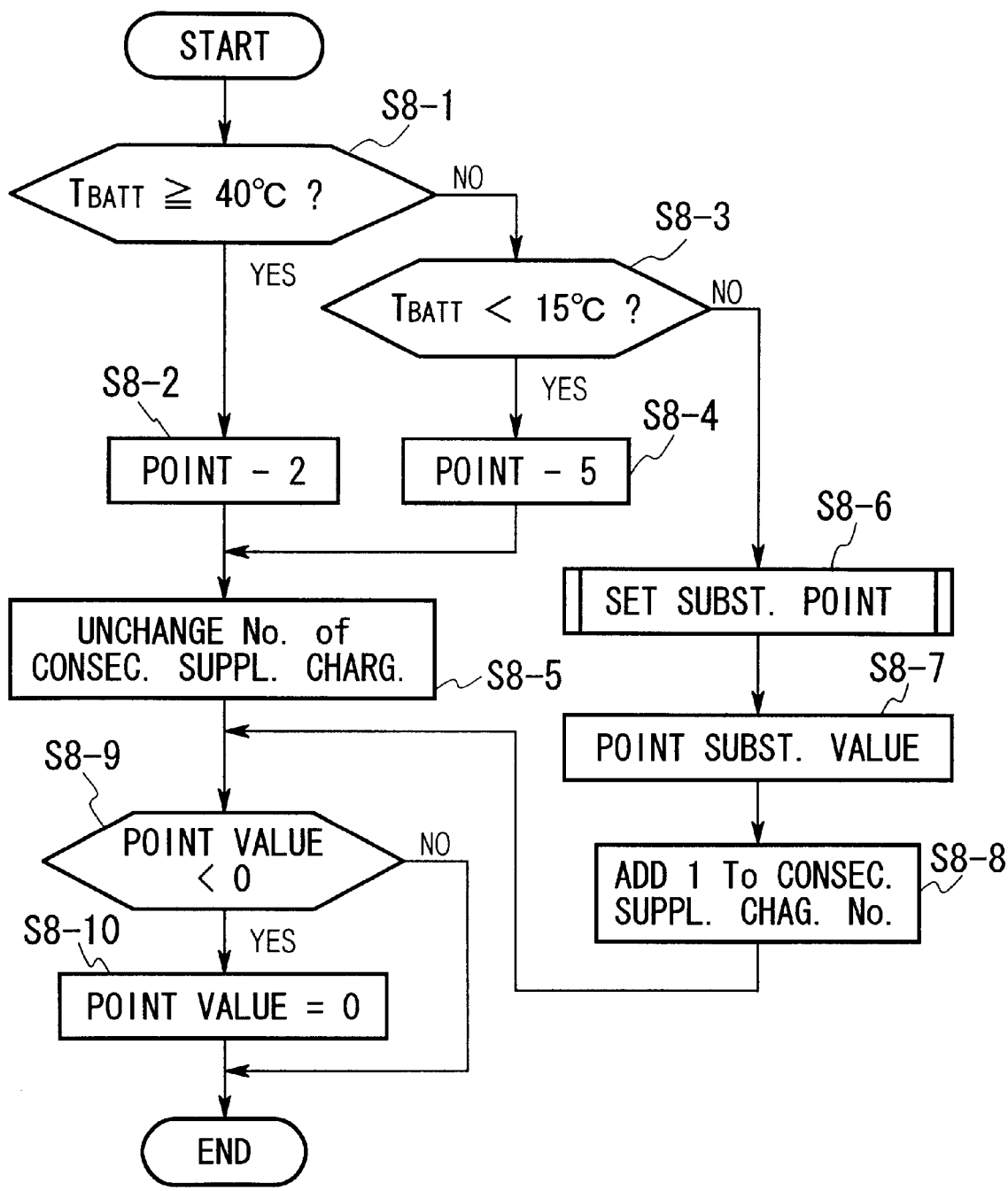
FIG. 6 is a flowchart for explaining a point value correction process carried out by using the battery charging control unit according to the embodiment of the present invention.

Step S8: carrying out the point value correction process of Step S8-1 through S8-10 shown in FIG. 6 after the termination of the supplemental charging process by the supplemental charging unit 14 of the ECU 11.

Step S9: clearing the consecutive supplemental charging number counter 16 of the ECU 11, which counts the number of consecutive supplemental charging processes performed. This is necessary because a charging process of the batteries 3 is terminated without carrying out a supplemental charging process.

Step S10: pulling out the plug 4, for instance, manually or mechanically from the outlet and returning it to the original position when the charging process of the batteries 3 is completed.

Next, the above-mentioned charging capacity insufficiency detection process (i.e., step S4), the supplemental charging process (i.e., step S7), and the point value correction process (i.e., step S8) will be explained in more detail.

(1) Charging Capacity Insufficiency Detection Process

Step S4-1: determining if the charging time has continued for more than one hour. If it is determined that the charging time has continued for more than one hour, then the flow proceeds to step S4-2. If it is determined that the charging time has continued for less than one hour, the charging capacity insufficiency detection process is terminated.

That is, if the charging time is less than one hour, an accumulation of points, which will be described later, is not carried out since the effect of the charging process on the batteries 3 is very minor and unlikely to be a factor for the charging capacity insufficiency of the batteries 3.

Step S4-2: determining if the charging process is terminated before completion (i.e., for instance, a manual termination) by pulling out the plug 4 from the outlet prior to the completion of the charging process.

If it is determined that the charging process is terminated before completion, the process proceeds to step S4-3. If it is determined that it is not terminated before completion, the process proceeds to step S4-4.

Step S4-3: adding one point to the point counter 15 and proceeding to step S4-8.

Step S4-4: determining if the charging process is temporarily stopped in order to protect the batteries 3 (i.e., a high temperature stop) because the temperature has risen higher than a first predetermined temperature (i.e., for instance, approximately 45° C.).

If it is determined that the process is stopped due to the high temperature of the batteries 3, the flow proceeds to step S4-5, and if it is determined that the process is not stopped due to high temperature, the flow proceeds to step S4-6.

Step S4-5: adding 8 point to the point counter 15 and proceeding to step S4-8.

Step S4-6: detecting the battery temperature $T_{BATT}$ of the batteries 3 when the normal charging process (or any other charging process) of the batteries 3 is automatically stopped (i.e., when the gradient of the temperature rise in the batteries 3 reaches, for instance, about dT/dt=1.5) and it is determined if the battery temperature $T_{BATT}$ is higher than a second predetermined temperature (i.e., for instance, approximately 35° C.).

If it is determined that the battery temperature $T_{BATT}$ is equal to or higher than the second predetermined temperature, 35° C. in this embodiment, then the flow proceeds to step S4-7. If the battery temperature $T_{BATT}$ is lower than the second predetermined temperature, then the flow proceeds to step S4-8.

Step S4-7: adding 10 points to the point counter 15 and proceeding to step S4-8.

Step S4-8: determining if the point value accumulated in the point counter 15 is greater than, for instance, 100 points or not.

If it is determined that the point value exceeds 100 points, then the flow proceeds to step S4-9. If it is determined that the point value does not exceed 100 points, then the charging capacity insufficiency detection process is terminated.

Step S4-9: correcting the point value exceeding 100 points in the point counter 15 to just 100 points and terminating the charging capacity insufficiency detection process.

That is, in the charging capacity insufficiency detection process, points are added to the point counter 15 according to the manner of termination of the charging process of the batteries 3 and the temperature at which the charging process is terminated.

Points are added to the point counter 15 in the charging capacity insufficiency detection process because all of the above-described cases can be a factor for generating a charging capacity insufficiency due to an early charging caused by memory effect. Specifically, the above-described cases include (1) the normal charging process is manually terminated, (2) the normal charging process is temporarily stopped in order to protect the batteries 3 due to the temperature rise in the batteries 3, and (3) the temperature of the batteries 3 is extremely high at the termination of the normal charging process.

(2) Supplemental Charging Process

Step S7-1: determining if the point value in the point counter 15 is, for instance, equal to or greater than 50 when a supplemental charging process is started.

If the point value is equal to or greater than 50 points, then the flow proceeds to step S7-2. If the point value is less than 50 points, then the flow proceeds to step S7-3.

Step S7-2: carrying out a supplemental charging process of the batteries 3 by the charger 5, for instance, at about 1 A for 8 hours. After that the supplemental charging process is terminated.

Step S7-3: carrying out a supplemental charging process of the batteries 3 by the charger 5, for instance, at about 2 A for 2 hours. After that the supplemental charging process is terminated.

As explained above, according to an embodiment of the present invention, the level of current and a time for carrying out the charging operation are changed in accordance with the points in the point counter 15 in the supplemental charging process. That is, a relatively heavy supplemental charging process is carried out using an effective current level and a charging time when the point value is relatively high since the magnitude of insufficiency in the charging capacity due to the memory effect is also large. On the other hand, a relatively light supplemental charging process is carried out using a relatively low current and short charging time when the point value is relatively small since the magnitude of insufficiency in the charging capacity due to the memory effect is also small.

(3) Point Value Correction Process

Step S8-1: determining whether the battery temperature $T_{BATT}$ is, for instance, equal to or higher than 40° C. If it is determined that the battery temperature $T_{BATT}$ is equal to or higher than 40° C., then the flow proceeds to step S8-2. If it is determined that the battery temperature $T_{BATT}$ is lower than 40° C., then the flow proceeds to step S8-3.

Step S8-2: subtracting 2 points from the point counter 15 and proceeding to step S8-5.

Step S8-3: determining whether the battery temperature $T_{BATT}$ is, for instance, lower than 15° C. If it is determined that the battery temperature $T_{BATT}$ is lower than 15° C., then the flow proceeds to step S8-4. If it is determined that the battery temperature $T_{BATT}$ is equal to or higher than 15° C., then the flow proceeds to step S8-6.

Step S8-4: subtracting 5 points from the point counter 15 and proceeding to step S8-5.

Step S8-5: maintaining the count number on the consecutive supplemental charging number counter 16 as it is and proceeding to step S8-10.

Step S8-6: selecting a subtracted point in accordance with the supplemental charging current and the number of supplemental charging operation performed if it is determined that the battery temperature $T_{BATT}$ is, for instance, in the range between 15° C. and 40° C. (i.e., 15° C.$\leq T_{BATT}$<40° C.) by the processes described in the above S8-1 and S8-3.

Figures 7, 8:
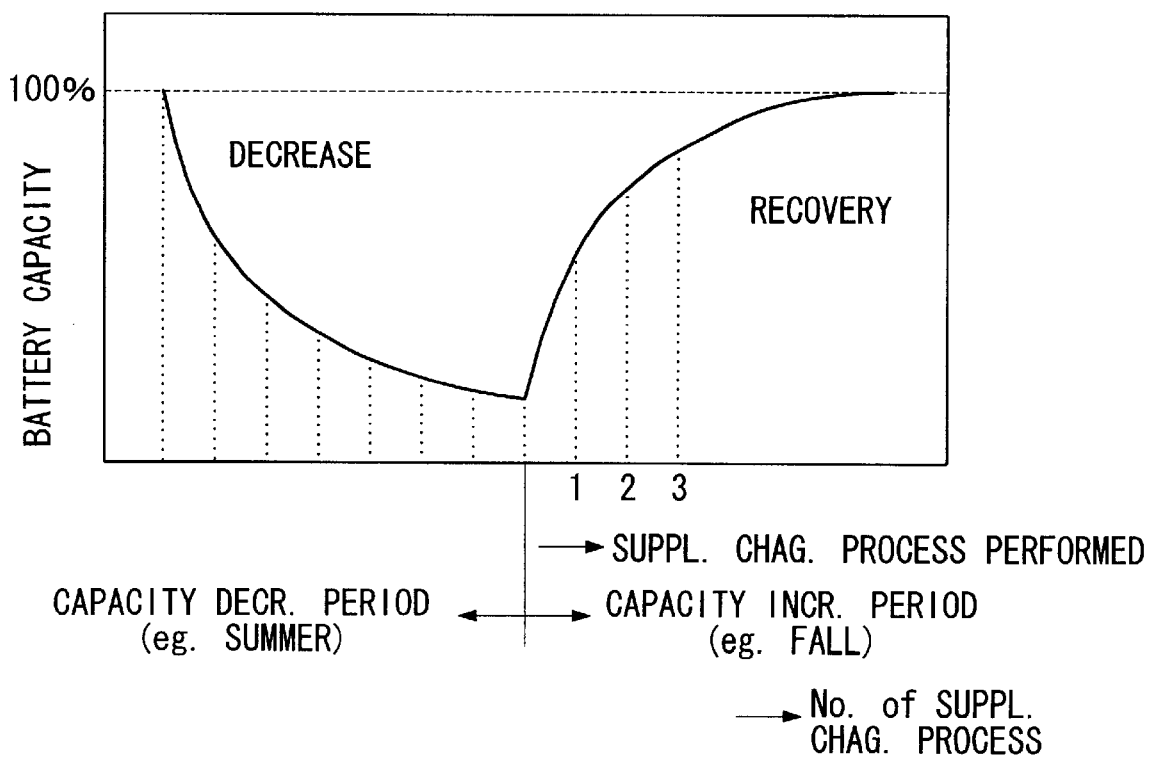
FIG. 7 is a table showing subtracted points which may be used in the point value correction process carried out by using the battery charging control unit according to the embodiment of the present invention.
FIG. 8 is a graph for explaining the basis of using the table shown in FIG. 7 in the point value correction process carried out by using the battery charging control unit according to the embodiment of the present invention.

The practical subtracted points may be determined, for instance, by referring to a predetermined subtraction value table shown in FIG. 7, which depends on such factors as the capacity or the kinds of the batteries 3.

That is, when the charging magnitude (i.e., for instance, ampere-hour) in the above-mentioned supplemental charging process (i.e., step S7) is 8 Ah, the subtracted points shown in the upper row of the table in FIG. 7 may be used. On the other hand, when the ampere-hours in the supplemental charging process are 4 Ah, the subtracted points shown in the lower row of the table may be used.

Also, it is set so that the subtracted points are decreased as the number on the consecutive supplemental charging number counter 16 is increased.

Step S8-7: subtracting the points selected in the above step S8-6 from the point counter 15.

Step S8-8: adding one to the count number on the consecutive supplemental charging number counter 16, and proceeding to step S8-9.

Step S8-9: determining if the point value in the point counter 15 is less than zero and, if it is determined to be less than zero, proceeding to step S8-10. On the other hand, if the point value is equal to or greater than zero, then the point correction process is terminated.

Step S8-10: resetting the point value in the point counter 15 to zero.

As mentioned above, in the point correction process, a point value, which corresponds to the restoring degree of the batteries 3 by the supplemental charging process, is subtracted from the point counter 15. It is recognized that the restoring of the batteries 3 by the supplemental charging process is significantly effective if it is carried out when the batteries 3 are at an ordinary temperature. Accordingly, in this embodiment, two points are subtracted when the battery temperature $T_{BATT}$ is relatively high (i.e., 40° C.$\leq T_{BATT}$), and five points are subtracted when the battery temperature $T_{BATT}$ is relatively low (i.e., $T_{BATT}$<15° C.) since the degree of restoration of the batteries 3 is considered to be low in such cases.

Also, when the temperature is in the ordinary temperature range (i.e., 15° C.$\leq T_{BATT}$<40° C.), in which the restoring of the batteries 3 is considered to be effective, a-subtracted point, which may correspond to the charging magnitude (i.e., for instance, ampere-hour) of the supplemental charging process and the number of consecutive supplemental charging processes, is selected from a predetermined subtracted point table and the points are subtracted from the point counter 15. That is, points in the subtracted point table differ in accordance with the charging degree used in the supplemental charging process. Thus, the subtracted points are relatively high for the cases where a relatively heavy supplemental charging process (i.e., for instance, 1 A, 8 hour) is carried out, and the points are relatively low for the cases where a relatively light supplemental charging process (i.e., f or instance, 2 A, 2 hour) is carried out.

Moreover, it is known that the degree of restoration of batteries 3 by a supplemental charging process differs depending on the number of such charging process continuously carried out. As shown in FIG. 8, when the supplemental charging process is carried out for the first time, the degree of restoration of the batteries 3 is largest and subsequently the degree of restoration gradually decreases as the number of supplemental charging process increases. For this reason, the subtracted points shown in the subtracted point table decrease as the number of consecutive supplemental process increases.

As mentioned above, according to an embodiment of the battery charging control unit of the present invention, since the supplemental charging unit 14 performs a supplemental charging process after the termination of a normal charging process, based on charging data in the previous charging operation which is accumulated by the charging capacity insufficiency detection unit 12, it becomes possible to more reliably restore the batteries 3 as compared with a conventional supplemental charging process in which a supplemental charging of batteries is carried out based on information about the batteries obtained only when an abnormality occurs, or a supplemental charging process is simply carried out periodically.

That is, according to an embodiment of the present invention, the past charging data is converted into point values and each point value is accumulated in the point counter 15 so that a supplemental charging process by the supplemental charging unit 14 may be carried out in an reliable manner for the batteries 3 by referring to the accumulated point.

More specifically, according to an embodiment of the present invention, the effect of: (1) the normal charging process being compulsory terminated; (2) the temperature of the batteries 3 being increased during the normal charging operation and reaching a predetermined temporarily charging stop temperature (i.e., approximately 45° C.); and (3) the temperature of the batteries 3 being higher than the predetermined temperature (i.e., approximately 35° C.) at the termination of the normal charging process, may be converted to points and accumulated so as to be reflected to a subsequent supplemental charging process. That is, factors for causing a charging capacity insufficiency as mentioned above are converted into numerical points and accumulated so that they may be reflected in carrying out a suitable supplemental charging process reliably.

Also, according to an embodiment of the present invention, the charging capacity restoring determination unit 13 determines, based on the condition at the charging operation, if the batteries 3 will be restored by a supplemental charging process, and the supplemental charging process is carried out only when the charging capacity restoring determination unit 13 determines that the batteries 3 will be restored. Accordingly, the supplemental charging process is not performed when the restoring of the batteries 3 is not expected and, hence, harmful effects on the batteries, such as a temperature increase thereof due to the supplemental charging process or the waste of charging time and energy, may be avoided.

In other words, problems associated with a conventional periodic supplemental charging process, wherein the process may be carried out when it is unnecessary and simply results in an increase in the temperature of batteries possibly shortening the life of the batteries, may be eliminated.

Moreover, according to an embodiment of the present invention, the charging capacity restoring determination unit 13 determines if the batteries 3 may be restored by a supplemental charging process based on one of the battery temperature $T_{BATT}$ and the outside air temperature $T_A$. Thus, it becomes possible to restore the batteries 3 reliably by carrying out a supplemental charging process only when the restoring of the batteries is expected.

Accordingly, the harmful effects on the batteries 3 which may be caused, for instance, by carrying out a supplemental charging process when the temperature of the batteries 3 $T_{BATT}$ or the outside air $T_A$ is high, may be avoided. Also, it becomes possible to save time and energy that would be wasted if unnecessary supplemental charging operation is performed.

Note that although data obtained from only one of the battery temperature $T_{BATT}$ or the outside air temperature $T_A$ is used in the above embodiment, the charging capacity restoring determination unit 13 may determine if the batteries 3 may be restored by a supplemental charging process based on detection data from both the battery temperature $T_{BATT}$ and the outside air temperature $T_A$.

Further, the charging capacity restoring determination unit 13 may determine the expectation of restoring of the batteries 3 based on date (or month, or season) information obtained from the integrated calendar 17 which is provided with the ECU 11. Also, it is possible to input data of annual temperature changes into the integrated calendar 17 so that the charging capacity restoring determination unit 13 may determine the expectation of restoring of the batteries 3 by a supplemental charging process based on the annual temperature change data as well as the calendar data. If such a method is adopted, the batteries 3 can be effectively restored by carrying out supplemental charging processes mainly during spring or fall, when the restoring of the batteries 3 is expected to be high, and avoid during a season such as summer or winter, when the restoring of the batteries 3 is not expected.

In addition, the determination of the charging capacity restoring determination unit 13 may be based on the abovementioned battery temperature $T_{BATT}$ and outside air temperature $T_A$ in association with the data of the integrated calendar 17.

Also, the supplemental charging unit 14 may carry out a supplemental charging process by using the most suitable charging magnitude for the batteries 3 having a certain number of points based on the point value of the point counter 15 so that the batteries 3 may be restored reliably. That is, for cases where the point value is large (i.e., for instance, 50≦point value), the magnitude of the supplemental charging may be increased so that the batteries 3 may be restored in a quick manner and, for cases where the point value is small (i.e., for instance, point value<50), the magnitude of the supplemental charging may be decreased so that the batteries 3 may be restored in an unforced manner.

Moreover, since the charging capacity insufficiency detection unit 12 subtracts a certain number of points from the point value in the point counter 15, which corresponds to the restoring of the batteries 3 after the termination of the supplemental charging process carried out by the supplemental charging unit 14, the degree of restoration can be reflected by the supplemental charging process as numerical points. Accordingly, the state of the batteries 3, which is converted into numerical points, may be reliably accumulated in the point counter 15.

Further, since the subtracted points that indicate the degree of restoration of the batteries 3 by the supplemental process may be predetermined in accordance with the temperature of the batteries 3, it becomes possible to accurately reflect the difference in the degree of restoration due to the temperature of the batteries $T_{BATT}$ by converting it into a certain number of subtracted points and subtracting such points from the point value in the point counter 15. The subtracted points, for instance, may be high in the temperature region where a large restoring of the batteries 3 is expected (i.e., for instance, $15°\text{C}.\leq T_{BATT}<40°\text{C}.$) and may be low when such restoring cannot be expected (i.e., for instance, $T_{BATT}<15°\text{C}.$ or $40°\text{C}.\leq T_{BATT}$).

Also, since the subtracted points are predetermined in accordance with the number of consecutive supplemental charging processes, it becomes possible to accurately reflect the degree of restoration of the batteries 3, which decreases as the number of consecutive supplemental processes increases, as a certain numerical value in the point counter 15 by subtracting the corresponding points from the point counter 15.

Moreover, since the subtracted points are predetermined in accordance with the charging magnitude of the supplemental charging process, it becomes possible to accurately convert the degree of restoration of the batteries 3 corresponding to the charging magnitude of the supplemental charging process into a certain number of points by, for instance, increasing the subtracted value when the charging magnitude is large (i.e., for instance, about 8 Ah) and decreasing the subtracted value when the charging magnitude is small (i.e., for instance, about 4 Ah), and reflecting the degree of restoration by a certain point value in the point counter 15 by subtracting the corresponding points from the point counter 15.

That is, according to an embodiment of the present invention, the degree of restoration of the batteries 3 which differs depending on an individual case may be accurately converted into a certain number of subtracted points, which is predetermined in accordance with such factors as the battery temperature $T_{BATT}$, the number of consecutive supplemental charging processes, or the charging magnitude of a supplemental charging process, and the degree of restoration may be reflected in a certain point value in the point counter 15 by subtracting the corresponding subtracted points from the point counter 15. Accordingly, the state of the batteries 3 may be reliably accumulated as a certain numerical point value in the point counter 15.

Note that the degree of restoration of the batteries 3 by a supplemental charging process may be varied by factors other than the battery temperature $T_{BATT}$, the number of consecutive supplemental charging process, and the charging current. Thus, the subtracted points may be predetermined based on the factors other than the ones explained above.

Having thus described an exemplary embodiment of the invention, it will be apparent that various alterations, modifications, and improvements will readily occur to those skilled in the art. Such alterations, modifications, and improvements, though not expressly described above, are nonetheless intended and implied to be within the spirit and scope of the invention. Accordingly, the foregoing discussion is intended to be illustrative only; the invention is limited and defined only by the following claims and equivalents thereto.

What is claimed is:

1. A battery charging control unit which controls electric power from a power source and supplies it to a battery via a charger, comprising:

a charging capacity insufficiency detection unit which detects an insufficiency in charging capacity of said battery based on the previous charging condition of said battery, said charging capacity insufficiency detection unit being capable of memorizing the detected insufficiency in charging capacity of said battery;

a charging capacity restoring determination unit which, after said charging capacity insufficiency detection unit detects an insufficiency in the charging capacity of said battery, determines if said insufficiency in charging capacity of said battery will be restored by carrying out a supplemental charging process for said battery; and a supplemental charging unit which carries out said supplemental charging process for said battery if said charging capacity insufficiency detection unit detects said insufficiency in charging capacity of said battery and said charging capacity restoring determination unit determines that said insufficiency in charging capacity of said battery will be restored by said supplemental charging process.

2. A battery charging control unit as set forth in claim 1, wherein said charging capacity restoring determination unit determines if said battery will be restored by said supplemental charging process based on at least one of a battery temperature and an outside air temperature.

3. A battery charging control unit as set forth in claim 1, further comprising: an integrated calendar, wherein said charging capacity restoring determination unit determines if said battery will be restored by said supplemental charging process based on said integrated calendar.

4. A battery charging control unit as set forth in claim 1, further comprising a point counter, wherein said charging capacity insufficiency detection unit is capable of calculating a degree of said insufficiency in charging capacity of said battery by adding certain predetermined points, which is based on said previous charging condition of said battery, to said point counter, and said supplemental charging unit is capable of carrying out said supplemental charging process when points on said point counter exceeds a predetermined value.

5. A battery charging control unit as set forth in claim 4, wherein said charging capacity insufficiency detection unit adds a certain number of points to said point counter if a charging process for charging said battery is terminated before completion.

6. A battery charging control unit as set forth in claim 5, wherein said charging capacity insufficiency detection unit adds a certain number of points to said point counter if a charging process for charging said battery is temporarily stopped due to a temperature rise in said battery exceeding a first predetermined temperature.

7. A battery charging control unit as set forth in claim 6, wherein said charging capacity insufficiency detection unit adds a certain number of points to said point counter if the temperature of said battery is greater than a second predetermined temperature upon the completion of said charging process.

8. A battery charging control unit as set forth in claim 7, wherein said charging capacity insufficiency detection unit subtracts, after the completion of said supplemental charging process by said supplemental charging unit, a certain number of points from a point value accumulated on said point counter.

9. A battery charging control unit as set forth in claim 8, wherein said points subtracted from said point value on said point counter are predetermined in accordance with the temperature of said battery at the completion of said supplemental charging process.

10. A battery charging control unit as set forth in claim 9, wherein said points subtracted from said point value on said point counter are predetermined in accordance with the charging magnitude of said supplemental charging process.

11. A battery charging control unit as set forth in claim 10, wherein said points subtracted from said point value on said point counter are predetermined in accordance with the number of said supplemental charging processes performed by said supplemental charging unit.

12. A battery charging control unit as set forth in claim 1, wherein said supplemental charging unit determines a charging manner in said supplemental charging process based on the level of charging capacity insufficiency detected by said charging capacity insufficiency detection unit.

13. A method for controlling battery charging by controlling electric power from a power source and supplying it to a battery via a charger, comprising the steps of:

(a) carrying out a charging capacity insufficiency detection process to determine whether the charging capacity of said battery is insufficient or not;

(b) carrying out a restoring effect determination process by which it is determined if the charging capacity insufficiency in said battery will be restored by a supplemental charging process; and (c) carrying out a supplemental charging process of said battery to restore the charging capacity insufficiency of said battery if it is determined that the charging capacity of said battery is insufficient in said charging capacity insufficiency detection process and that said battery will be restored by said supplemental charging processes in said restoring effect determination process.

14. A method for controlling battery charging as set forth in claim 13, wherein whether said battery will be restored by the supplemental charging process in said restoring effect determination process is determined based on information of at least one of a battery temperature, an outside air temperature, and an integrated calendar.

15. A method for controlling battery charging as set forth in claim 13, wherein said charging capacity insufficiency detection process comprises the steps of:

(i) determining if the charging process is terminated before the completion of the charging process, and adding a certain number of points if it is determined that the charging process is terminated before completion;

(ii) determining if the charging process is temporarily stopped because of the temperature rise in said battery higher than a first predetermined temperature, and adding a certain number of points if it is determined that the charging process is temporarily stopped because the temperature rise in said battery is higher than the first predetermined temperature; and (iii) determining if the temperature of said battery is higher than a second predetermined temperature when the charging process is completed, and adding a certain number of points if it is determined that the battery temperature is higher than the second predetermined temperature.

16. A method for controlling battery charging as set forth in claim 15, wherein said charging capacity insufficiency detection process further comprises the steps of:

(iv) accumulating the points obtained in the steps (i) through (iii) and determining if the accumulated point is greater than a first predetermined point; and (v) correcting the accumulated point, if the accumulated point is greater than the first predetermined point, so that the accumulated point be just the first predetermined point.

17. A method for controlling battery charging as set forth in claim 16, wherein said supplemental charging process comprises the steps of:

(i) determining if the accumulated point is greater than a second predetermined point when said supplemental charging process is started;

(ii) carrying out a supplemental charging process of said battery in a relatively heavy manner if it is determined that the accumulated points are equal to or greater than the second predetermined point in step (i); and (iii) carrying out a supplemental charging process of said battery in a relatively light manner if it is determined that the accumulated points are smaller than the second predetermined point in step (i).

18. A method for controlling battery charging as set forth in claim 17, further comprises the steps of:

(d) carrying out a point value correction process which comprises the steps of:
  (i) determining whether the battery temperature is equal to or higher than a third predetermined temperature, and subtracting a certain number of points if it is determined that the battery temperature is equal to or higher than the third predetermined temperature;
  (ii) determining whether the battery temperature is lower than a fourth predetermined temperature, and subtracting a certain number of points if it is determined that the battery temperature is lower than the fourth predetermined temperature; and
  (iii) determining whether the battery temperature is in the range between the third and the fourth predetermined temperatures, and subtracting a certain number of points which corresponds to the charging magnitude and the number of charging processes performed if it is determined that the battery temperature is in the range between the third and the fourth predetermined temperatures.

19. A method for controlling battery charging as set forth in claim 18, wherein said point value correction process further comprises the steps of:

(iv) calculating the total of the points obtained in the steps (i) through (iii) of said charging capacity insufficiency detection process and the points subtracted in the steps of (i) through (iii) of said point value correction process and determining if the accumulated point is greater than a third predetermined point; and (v) correcting the calculated total point, if the total points is less than zero, so that the calculated point is zero.

20. A method for controlling battery charging as set forth in claim 19, wherein whether the charging capacity of said battery is insufficient or not in said charging capacity insufficiency detection process is determined based on the calculated total points.

* * * * *